(12) United States Patent
Wu et al.

(10) Patent No.: US 11,418,245 B2
(45) Date of Patent: Aug. 16, 2022

(54) CHANNEL STATE INFORMATION (CSI) WITH SPATIAL AND TIME DOMAIN COMPRESSION

(71) Applicant: QUALCOMM Incorporated, San Diego, CA (US)

(72) Inventors: Liangming Wu, Beijing (CN); Yu Zhang, Beijing (CN); Chenxi Hao, Beijing (CN); Qiaoyu Li, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/275,416

(22) PCT Filed: Sep. 26, 2019

(86) PCT No.: PCT/CN2019/108067
§ 371 (c)(1),
(2) Date: Mar. 11, 2021

(87) PCT Pub. No.: WO2020/063726
PCT Pub. Date: Apr. 2, 2020

(65) Prior Publication Data
US 2022/0052739 A1  Feb. 17, 2022

(30) Foreign Application Priority Data

Sep. 28, 2018  (WO) ................ PCT/CN2018/108299

(51) Int. Cl.
*H04B 7/02*   (2018.01)
*H04B 7/06*   (2006.01)
*H04B 7/0456* (2017.01)

(52) U.S. Cl.
CPC ......... *H04B 7/0639* (2013.01); *H04B 7/0456* (2013.01)

(58) Field of Classification Search
CPC .......................... H04B 7/0639; H04B 7/0456
(Continued)

(56) References Cited

U.S. PATENT DOCUMENTS 9,755,714 B2 * 9/2017 Bose ...................... H04B 7/024
10,505,600 B2 * 12/2019 Faxer .................. H04B 7/0478
(Continued)

FOREIGN PATENT DOCUMENTS

| CN | 104737465 A    | 6/2015 |
| CN | 106664128 A    | 5/2017 |
| WO | 2011066296 A1  | 6/2011 |

OTHER PUBLICATIONS

CATT: "UL UCI Enhancement for P-CSI Feedback", 3GPP TSG RAN WG1 Meeting #82bis, R1-155184, Oct. 9, 2015, pp. 1-6.
(Continued)

*Primary Examiner* — Helene E Tayong
(74) *Attorney, Agent, or Firm* — Qualcomm Incorporated

(57) ABSTRACT

Certain aspects of the present disclosure provide techniques for reporting channel state information (CSI) with spatial and time domain compression. A method comprises receiving one or more signals from a second wireless communications device, determining a precoder matrix index (PMI) based on the signals, performing a channel-tap compression of the PMI and transmitting the channel-tap compressed PMI to the second wireless communications device.

26 Claims, 15 Drawing Sheets

(58) Field of Classification Search
USPC ............................................. 375/267
See application file for complete search history.

(56) References Cited

U.S. PATENT DOCUMENTS

| | | | |
|---|---|---|---|
| 11,038,574 B2* | 6/2021 | Chen | .................... H04B 7/0632 |
| 2009/0046569 A1 | 2/2009 | Chen et al. | |
| 2010/0238984 A1 | 9/2010 | Sayana et al. | |
| 2010/0271931 A1 | 10/2010 | Cheng et al. | |
| 2011/0085460 A1 | 4/2011 | Zhang et al. | |
| 2016/0191126 A1* | 6/2016 | Bose | .................... H04B 7/0452 |
| | | | 370/329 |
| 2018/0138954 A1* | 5/2018 | Gao | .................... H04B 7/0623 |

OTHER PUBLICATIONS

International Search Report and Written Opinion—PCT/CN2018/108299—ISA/EPO—dated Apr. 28, 2019.
International Search Report and Written Opinion—PCT/CN2019/108067—ISA/EPO—dated Jan. 8, 2020.
Huawei., et al., "Enhancements on CSI Reporting and Codebook Design", 3GPP TSG RAN WG1 Meeting #94, 3GPP Draft, R1-1808949, 3rd Generation Partnership Project (3GPP), Mobile Competence Centre, 650, Route Des Lucioles, F-06921 Sophia-Antipolis Cedex, France, vol. RAN WG1, Aug. 11, 2018 (Aug. 11, 2018), pp. 1-7, XP051516324, Retrieved from the Internet: URL: https://www.3gpp.org/ftp/TSG_RAN/WG1_RL1/TSGR1_94/Docs/R1-1808949.zip, Section 2.2, p. 2.
Supplementary European Search Report—EP19866201—Search Authority—The Hauge—dated May 24, 2022.

* cited by examiner

CHANNEL STATE INFORMATION (CSI) WITH SPATIAL AND TIME DOMAIN COMPRESSION

CROSS REFERENCE TO RELATED APPLICATIONS

This application is a national stage application under 35 U.S.C. 371 of PCT/CN2019/108067, filed Sep. 26, 2019, which claims priority to International Application No. PCT/CN2018/108299 filed Sep. 28, 2018, which are assigned to the assignee of the present application and are expressly incorporated by reference herein in their entireties.

FIELD OF THE DISCLOSURE

Aspects of the present disclosure relate to wireless communications, and more particularly, to techniques for reporting channel state information (CSI) with spatial and time domain compression.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication performed by first wireless communications device (e.g., a user equipment (UE)). The method generally includes receiving one or more signals from a second wireless communications device. The method also includes determining a precoder matrix index (PMI) based on the signals. The method also includes performing a channel-tap compression of the PMI. The method also includes transmitting the channel-tap compressed PMI to the second wireless communications device.

Certain aspects provide a method for wireless communication performed by a second wireless communications device (e.g., a base station (BS)). The method generally includes transmitting one or more signals to a first wireless communications device. The method also includes receiving a channel-tap compressed PMI from the first wireless communications device. The method also includes decompressing the channel-tap compressed PMI to derive a PMI. The method also includes adjusting a configuration of one or more antennas of the BS based on the PMI.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
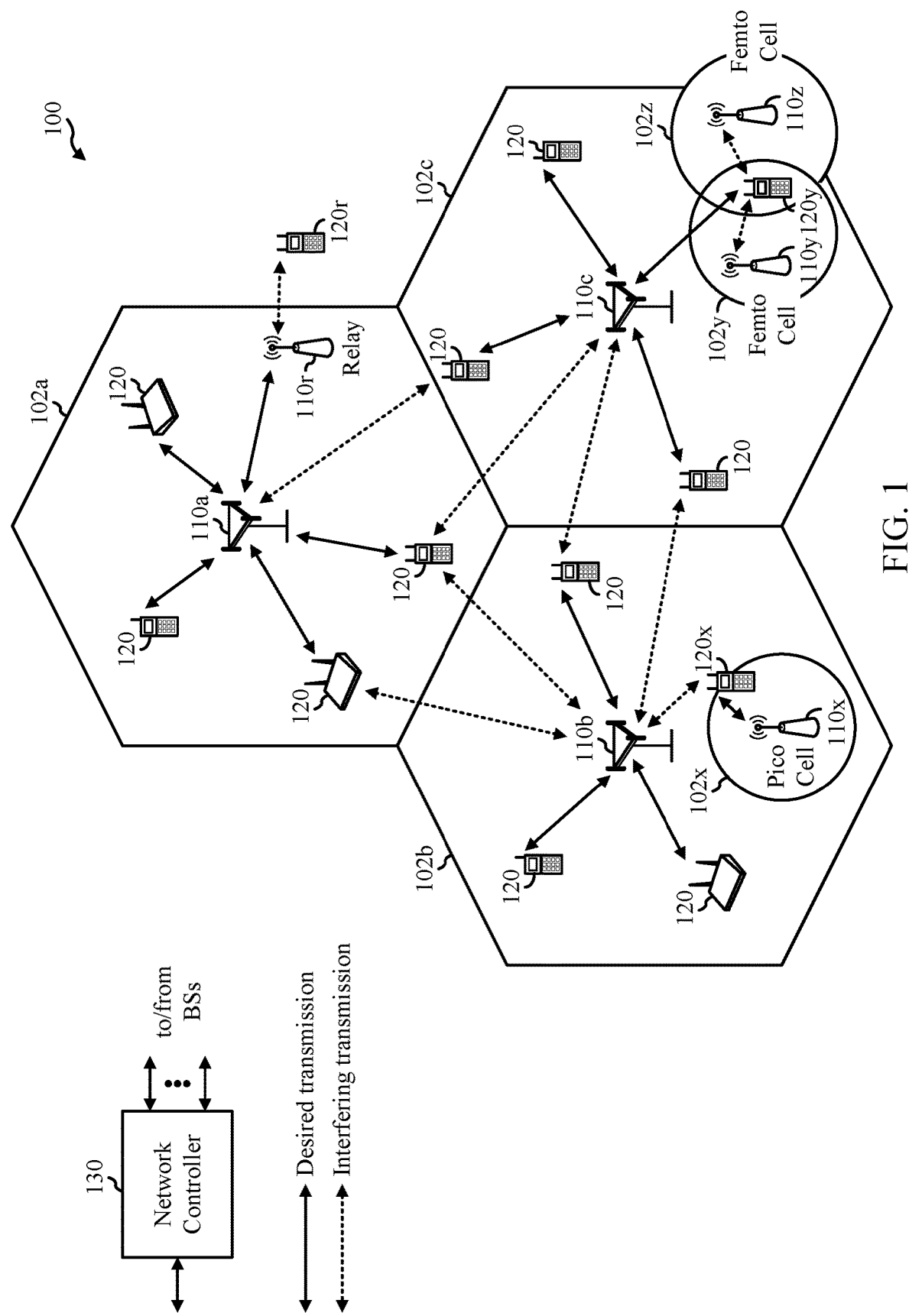
FIG. 1 is a block diagram conceptually illustrating an example telecommunications system, in accordance with certain aspects of the present disclosure.

Aspects of the present disclosure provide apparatus, methods, processing systems, and computer readable mediums for reporting feedback, for example, channel state information (CSI) with spatial and time domain compression. As will be described in greater detail below, the feedback may indicate taps corresponding to a number of non-zero values. The information regarding these taps may represent CSI (e.g., for a single receive antenna and transmit beam (RX/TB) pair across one or more subbands). Each tap may be associated with an amplitude and phase of the reference signal at a given time of (delay associated with) the tap. The UE may report the tap information (e.g., tap location/index, amplitude, and phase for each tap associated with each RX/TB pair) to the BS as the CSI. For example, the BS may use the tap information to reconstruct the CSI and may also consider the tap information as decoder feedback (e.g., allowing the BS to strategically adjust encoding). The schemes described herein relate to reducing the overhead associated with the CSI feedback reporting. For example, in certain embodiments, a multi-stage compression technique is described for compressing tap information, thereby reducing the overhead associated with reporting the tap information.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP).

cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. In another example, the wireless communication network 100 may be an LTE network, in which a UE 120 provides CSI feedback (e.g., tap information). As described in greater detail below, the tap information may represent CSI (e.g., for a single receive antenna and transmit beam (RX/TB) pair across one or more subbands) and may also be considered as decoder feedback.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
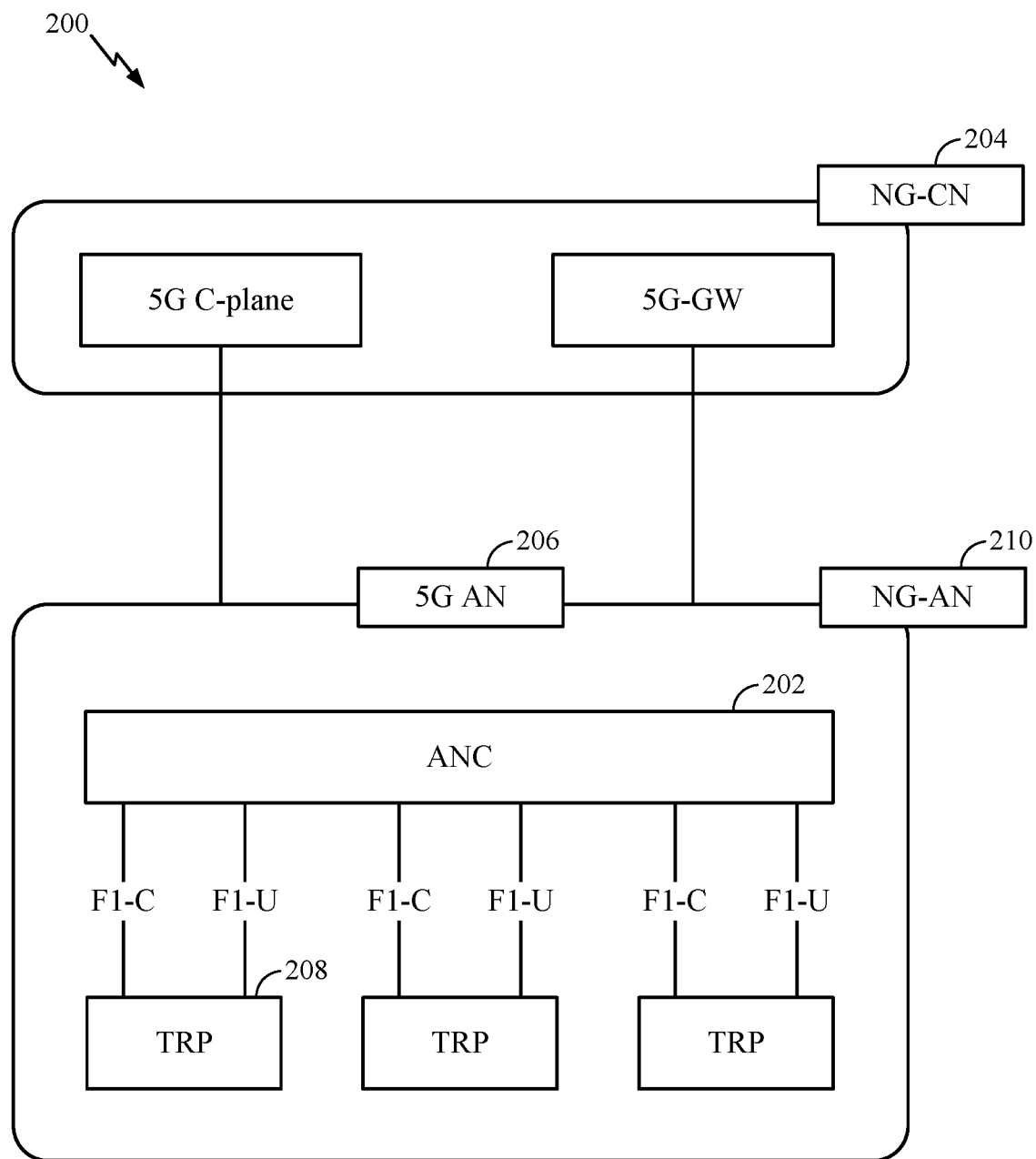
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
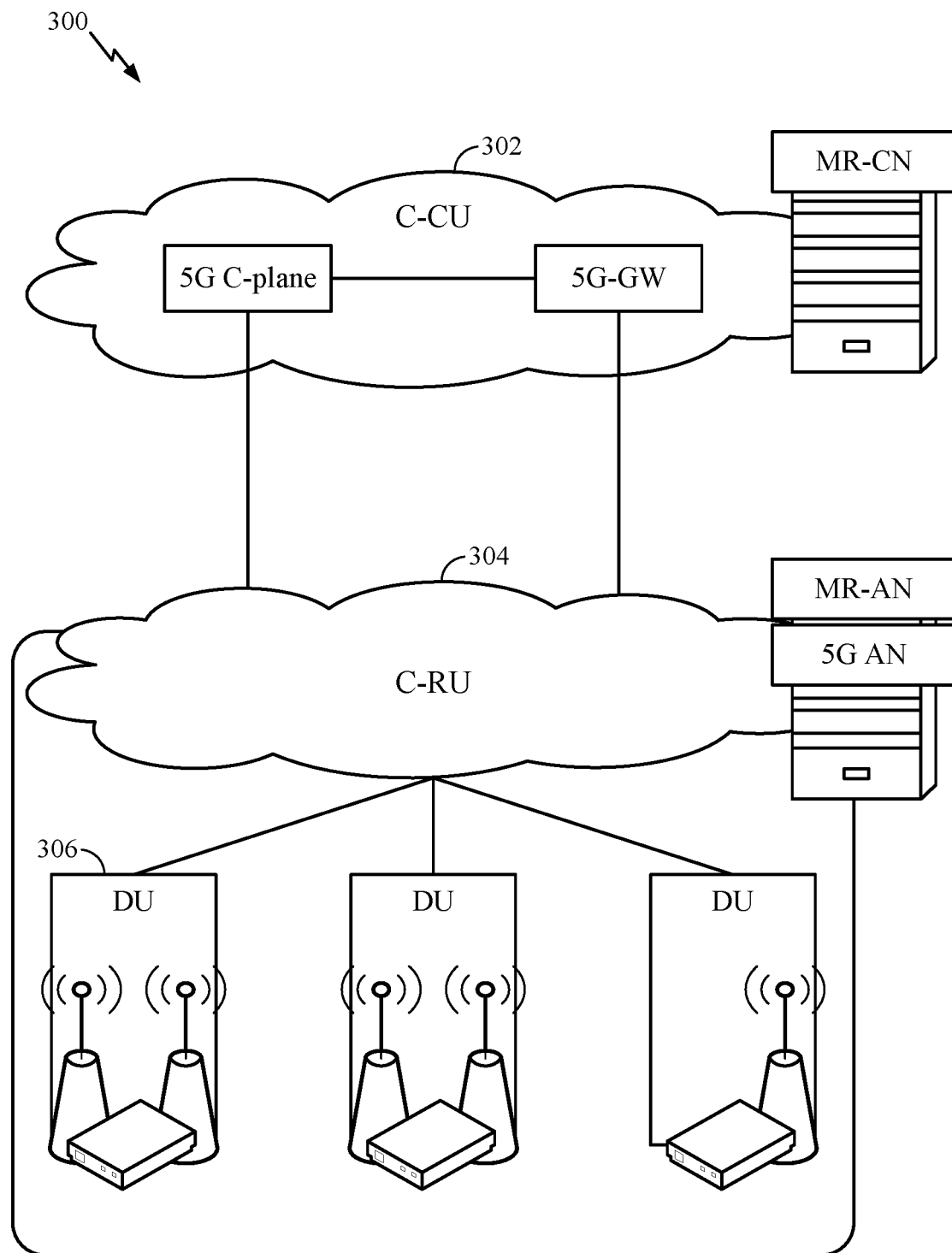
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
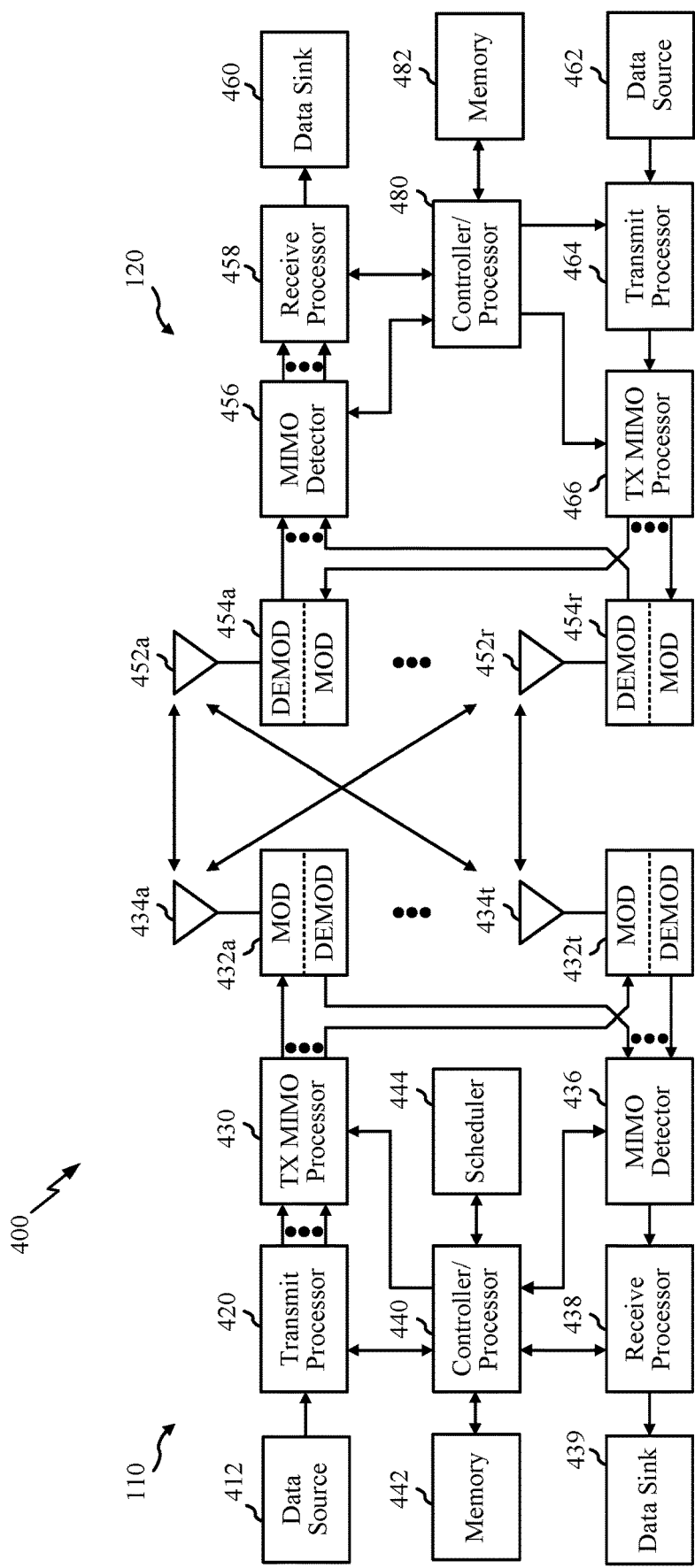
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein (e.g., operations described in FIGS. 9-10).

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
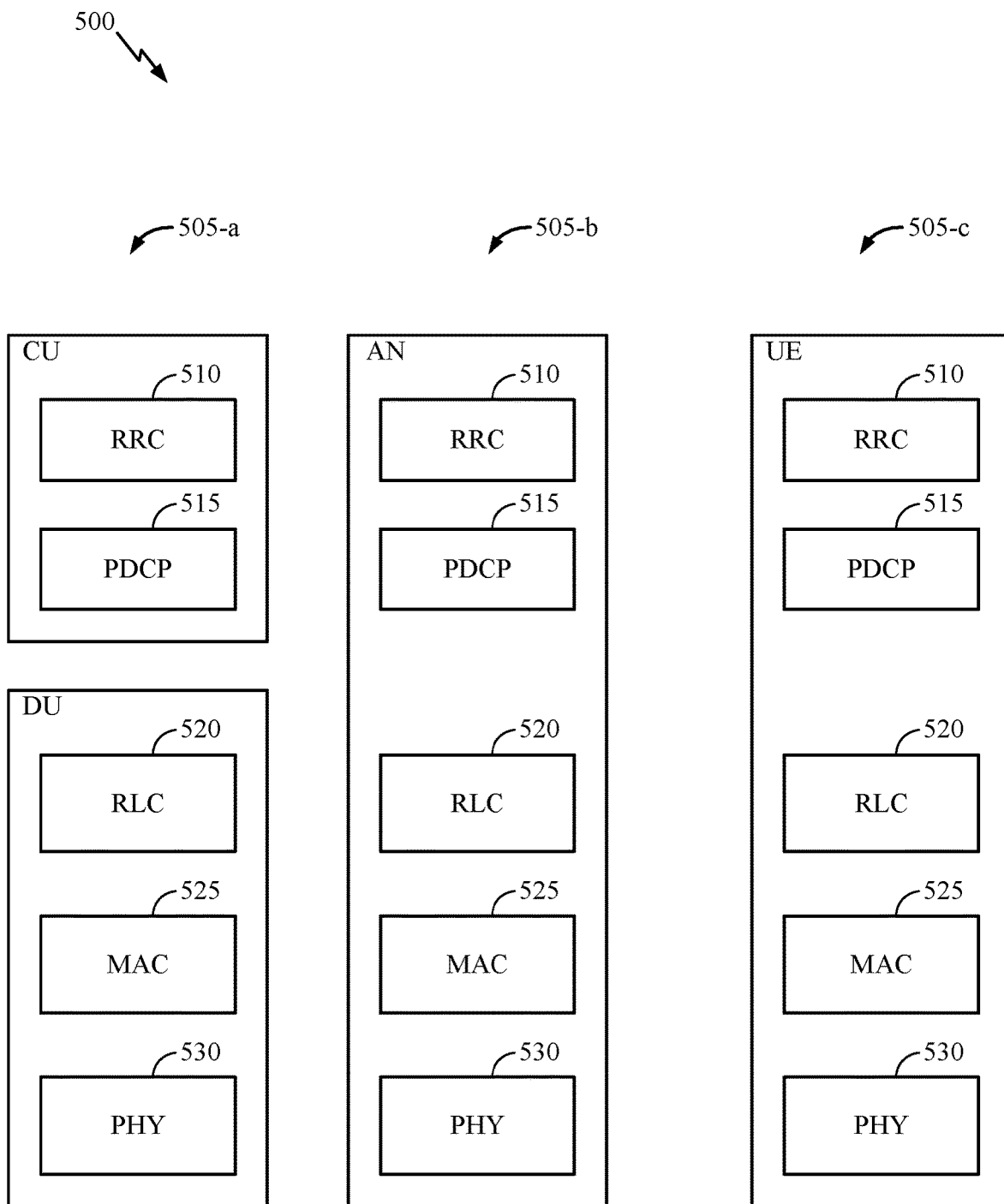
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
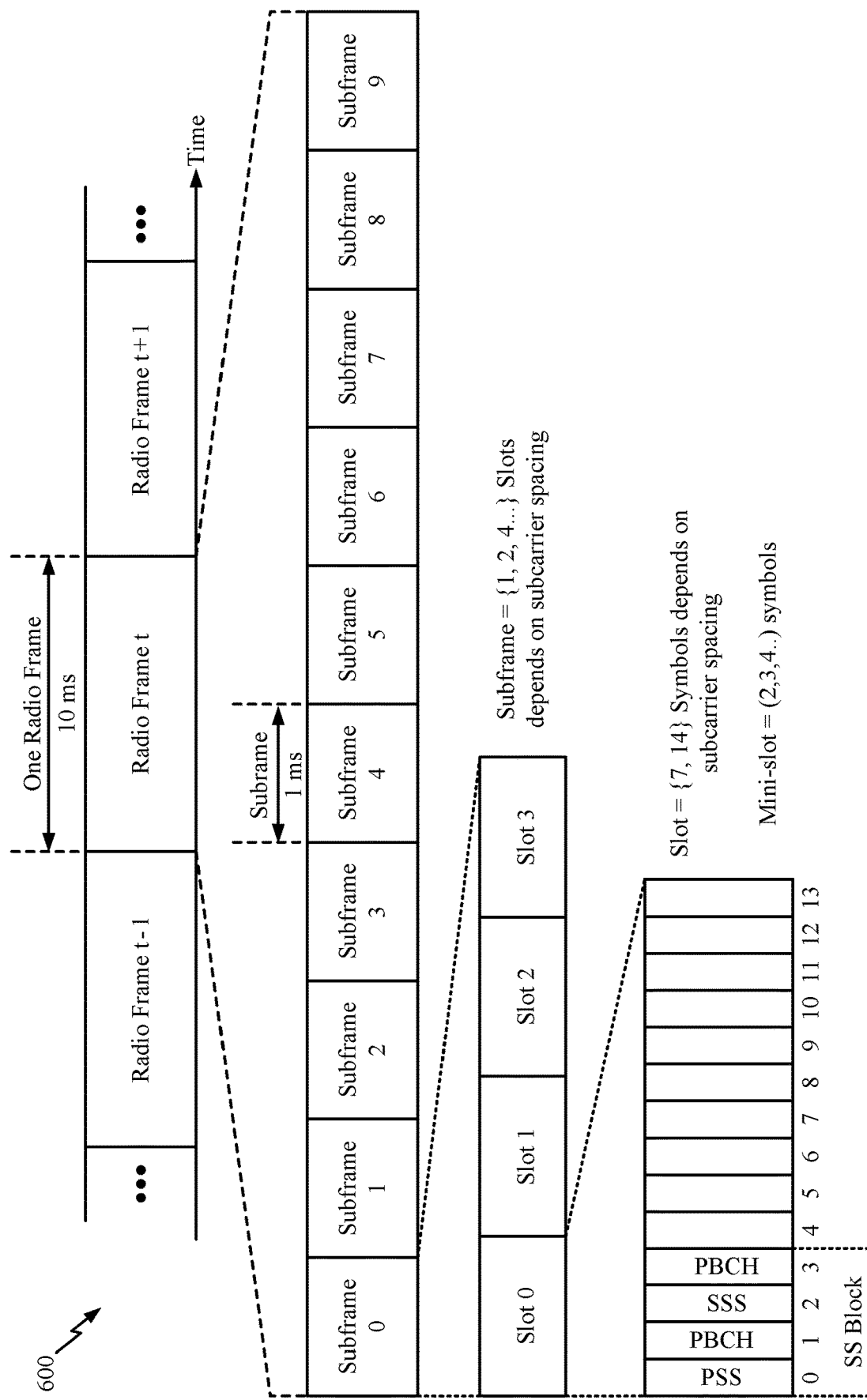
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof.

Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Channel State Information (CSI) with Spatial and Time Domain Compression As channel conditions between a user equipment (UE) and a base station (BS) change, it is important for the UE to report (e.g., periodically or aperiodically) feedback. For example, a US may report, as feedback to the BS, certain indications (e.g., channel quality indicator (CQI), preceding matrix index (PMI), and rank indicator (RI)) about the latest channel conditions to the BS.

The BS then utilizes the received CSI report to improve communications with the UE. In certain aspects, such as under the NR-5G standards, CSI reporting with two types of spatial information feedback is supported. Type I CSI feedback generally refers to a CSI feedback scheme that is also used by wireless communications devices comporting to the LTE standards. Type I CSI feedback comprises codebook-based PMI feedback with normal spatial resolution. Type II CSI feedback generally refers to an enhanced feedback scheme, enabling explicit feedback and/or codebook-based feedback with higher spatial resolution.

Figure 7:
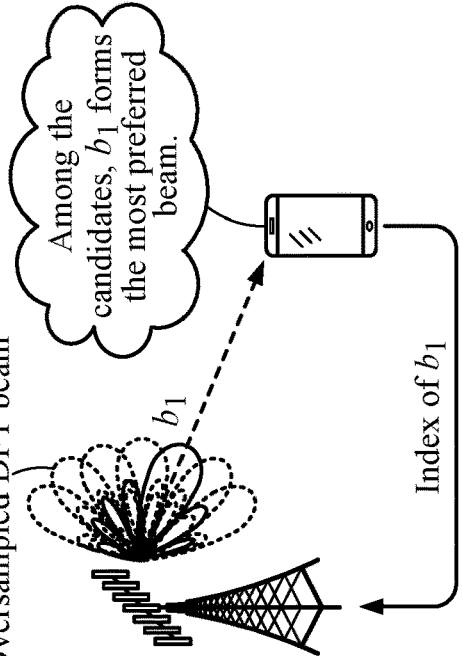
FIG. 7 shows a comparison between the Type 1 and Type 2 precoder feedback.

FIG. 7 shows a comparison between the Type 1 and Type 2 precoder feedback. As shown, a Type I CSI feedback corresponds to a lower resolution and smaller payload while Type II CSI corresponds to a higher resolution and larger payload. That is because Type II CSI feedback includes information such as amplitude, phase, etc. of transmit antennas associated with different widebands and subbands for different beams.

For Type II CSI feedback, at least one of Categories 1, 2, and/or 3 may be used. Category 1 relates to reporting a precoder feedback based on a linear combination of dual-stage codebooks. In certain aspects, a linear combination of the dual-stage codebooks supports up to four beam combinations with a certain precoder structure. For example, the PMI codebook may assume the following precoder structure:

For rank 1:

$$W = \begin{bmatrix} \tilde{w}_{0,0} \\ \tilde{w}_{1,0} \end{bmatrix} = W_1 W_2,$$

where W is normalized to 1. $W_1$ and $W_2$ indicate precoding weights for rank 1 (or transmission layer 1). For rank 2:

$$W = \begin{bmatrix} \tilde{w}_{0,0} & \tilde{w}_{0,1} \\ \tilde{w}_{1,0} & \tilde{w}_{1,1} \end{bmatrix} = W_1 W_2,$$

where columns of W are normalized to $$\frac{1}{\sqrt{2}}.$$

Based on such a precoder structure, the UE may feed the following information back to the BS:

$$\tilde{w}_{r,l} = \sum_{i=0}^{L-1} b_{k_1^{(i)}, k_2^{(i)}} \cdot p_{r,l,i}^{(WB)} \cdot p_{r,l,i}^{(SB)} \cdot c_{r,l,i}$$

(weighted combination of L beams). In this formula, r stands for polarization and l stands for transmission layer. In addition, up to L wideband orthogonal beams are selected. As shown, the UE reports the wideband amplitude as well as the subband differential amplitude. Also, a number of bits (e.g., 2 or 3 bits) are used to report the subband phase with amplitude dependent quantization.

Because Type II CSI reporting provides a higher resolution (more granular channel information over a number of subbands, transmission layers, and/or beams etc.), the overhead associated with Type II CSI reporting is large even if the reporting is performed for only two transmission layers (e.g., up to rank 2). For example, the total PMI bits may be more than, for example, 900 bits in the worst case scenario for 3GPP's Rel.15 type-II CSI. Also, a trivial extension to a higher rank may result in even larger payload bits. In addition, payload (or overhead) increases linearly as the number of beams and/or ranks increases.

Figures 8A, 8B:
FIG. 8a shows the linear relationship between the number of subbands, beams, and ranks, over which reporting is performed and the payload.
FIG. 8b illustrates the increase in payload bits for each subband with different numbers of beams and ranks.

FIG. 8a shows the linear relationship between payload and the number of subbands, beams, and ranks, over which reporting is performed. As shown, the UE may feedback a spatial compression matrix ($B_{Nt,Nb}$) with a payload size corresponding to $\lceil \log_2 C_{N_t/2}^L \rceil$, which increases as L (the number of Discrete Fourier Transform beam basis) increases. Similarly, as shown, each of the wideband amplitude, subband amplitude, and subband phase corresponds to payload that increases as L and/or R increase. FIG. 8b illustrates the increase in payload bits for each subband with different numbers of beams (L) and ranks (r).

Accordingly, certain embodiments described herein relate to performing a compression of the PMI that is reported to the BS in order to reduce the overhead associated with the CSI feedback reporting.

Figure 9:
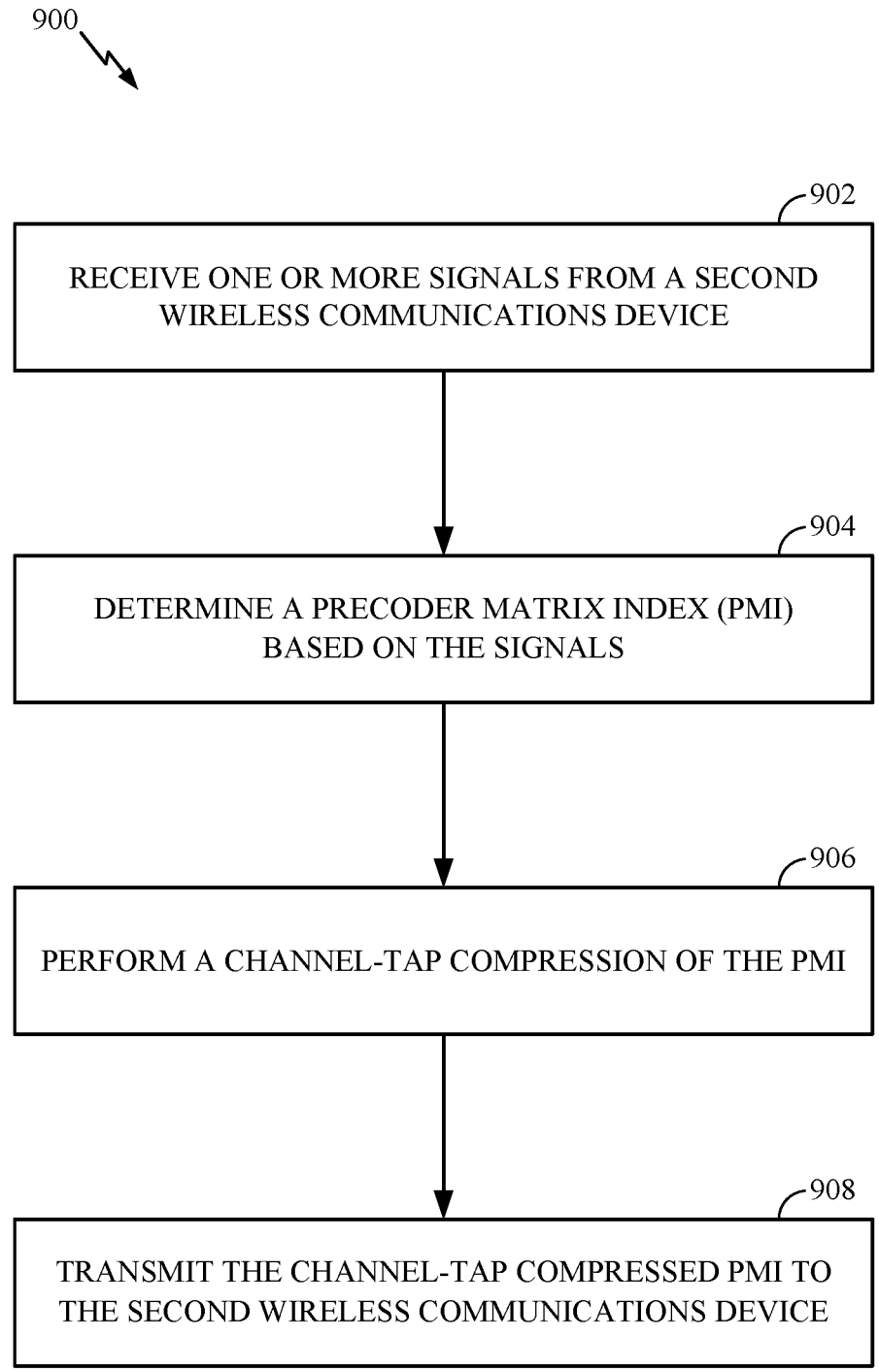
FIG. 9 illustrates example operations performed by a first wireless communications device, according to aspects of the present disclosure.

FIG. 9 illustrates example operations 900 performed by a first wireless communications device, according to aspects of the present disclosure. In certain aspects, the first wireless communications device may be a UE (e.g., UE 120)

Operations 900 begin, at 902, by receiving one or more signals from a second wireless communications device. At 904, operations 900 continue by determining a precoder matrix index (PMI) based on the signals. At 906, operations 900 continue by performing a channel-tap compression of the PMI. At 908, operations 900 continue by transmitting the channel-tap compressed PMI to the second wireless communications device.

Figure 10:
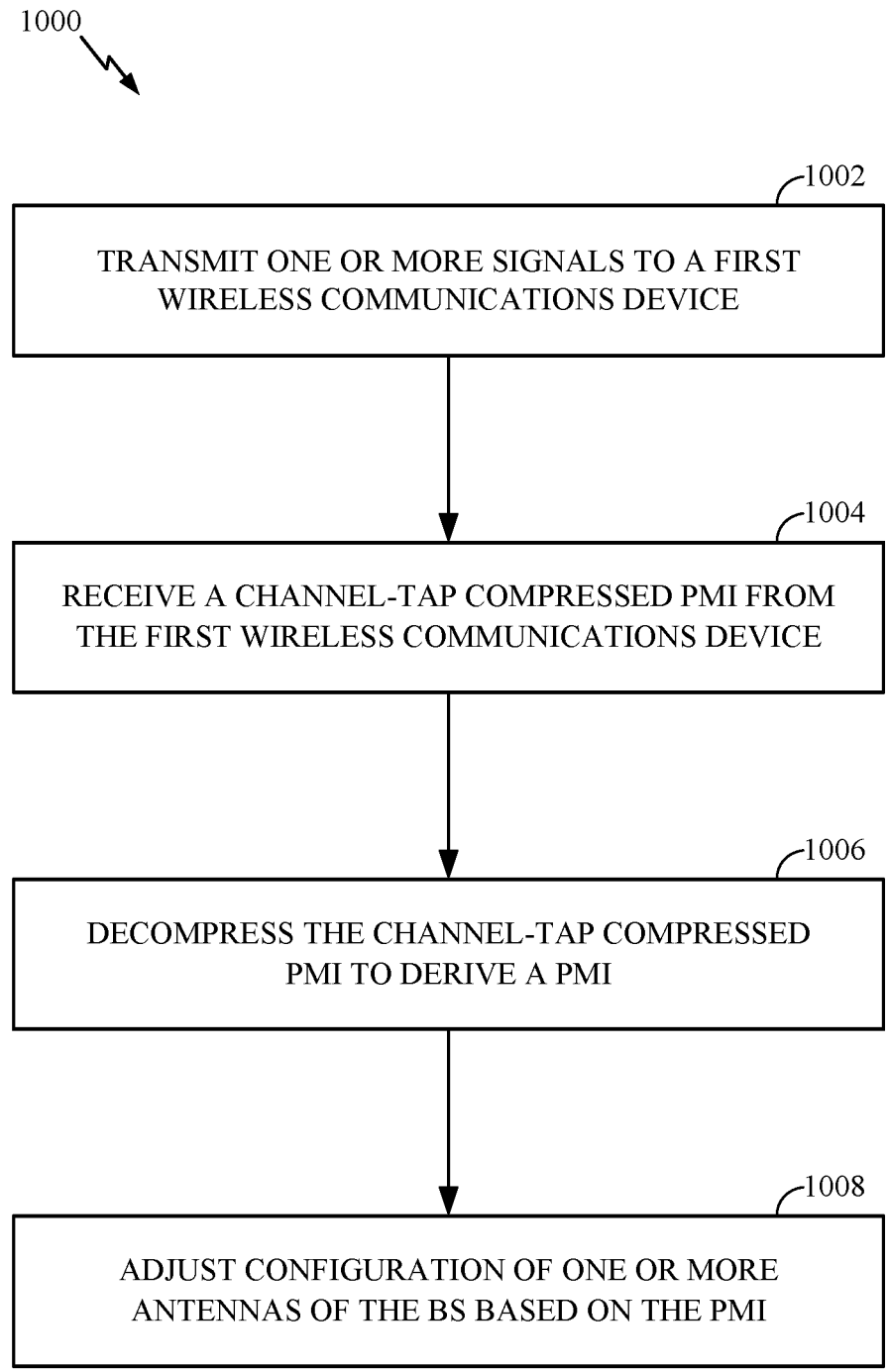
FIG. 10 illustrates example operations performed by a second wireless communications device, according to aspects of the present disclosure.

FIG. 10 illustrates example operations 1000 performed by a second wireless communications device, according to aspects of the present disclosure. In certain aspects, the second wireless communications device may be a BS (e.g., BS 110)

Operations 1000 begin, at 1002, by transmitting one or more signals to a first wireless communications device. At 1004, operations 1000 continue by receiving a channel-tap compressed PMI from the first wireless communications device. At 1006, operations 1000 continue by decompressing the channel-tap compressed PMI to derive a PMI. At 1008, operations 1000 continue by adjusting a configuration of one or more antennas of the BS based on the PMI.

In certain aspects, prior to transmitting PMI to the BS, the UE compresses the PMI. The compression, in certain aspects, involves a spatial compression as well as a time domain compression.

Figure 11:
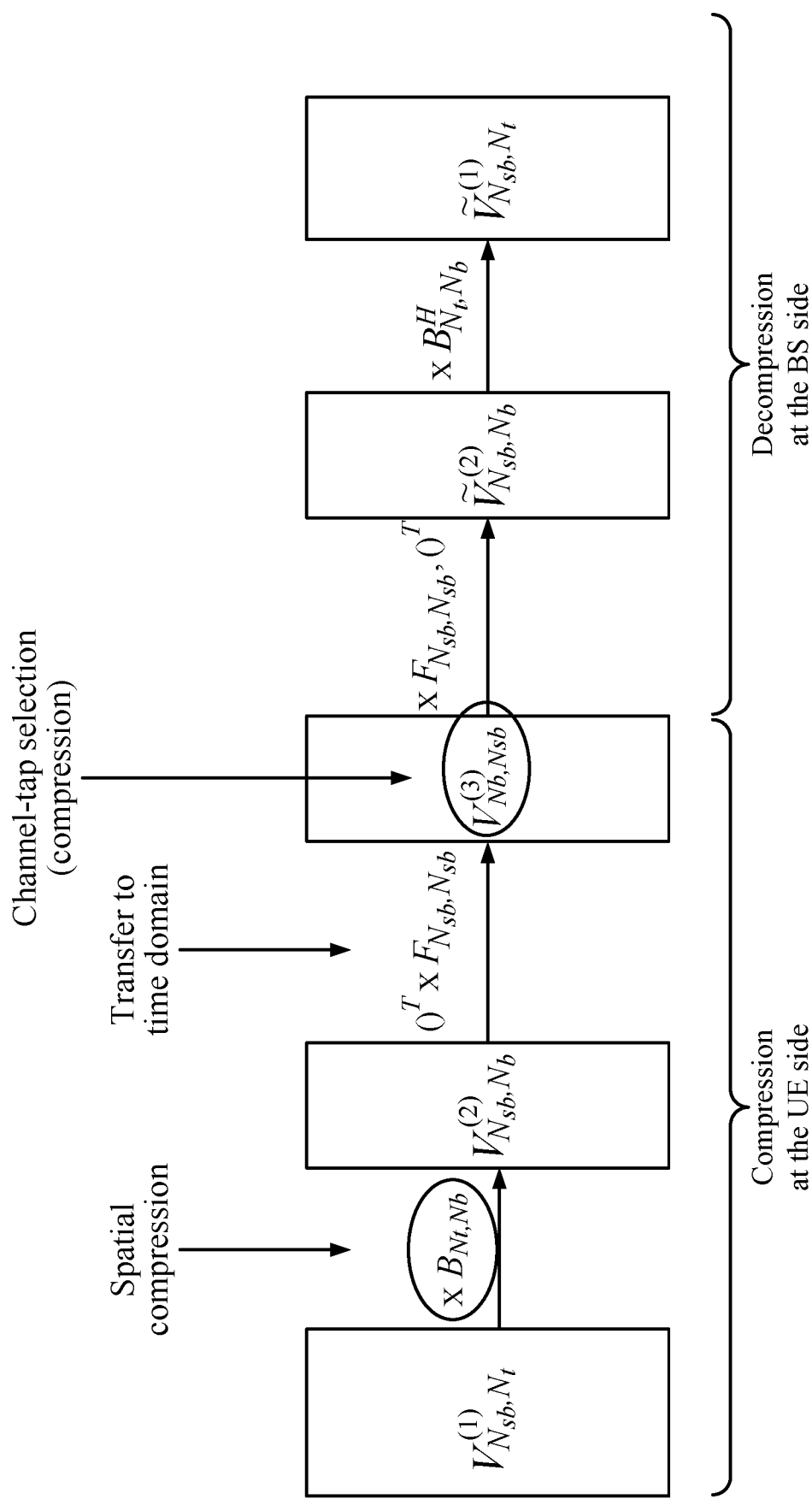
FIG. 11 illustrates an example flow diagram of precoder matrix index (PMI) compression at the user equipment (UE) side as well as PMI decompression at the base station (BS) side, according to aspects of the present disclosure.

FIG. 11 illustrates an example flow diagram of PMI compression at the UE side as well as PMI decompression at the BS side. PMI is shown in FIG. 11 as $V_{Nsb,Nt}$, which includes precoder weights for $N_t$ transmit antennas over $N_{sb}$ subbands. As shown, in certain aspects, the PMI is spatially compressed using a spatial compression matrix (e.g., DTF matrix) with a certain basis (e.g., DFT basis). In certain aspects, the basis may be known to both the UE and the BS. As such, the UE is not required to report the basis of the compression matrix to the BS, thereby, reducing the overhead associated with the CSI reporting. In certain aspects, the spatial compression matrix may be denoted as $B_{Nt,Nb}$.

In certain aspects, after spatially compressing the PMI, the UE may derive a time-domain representation of the spatially compressed PMI. In certain aspects, this is performed by using a DFT matrix. For example, the UE may perform a Fast Fourier Transform (FFT) operation to derive the time domain representation of the spatially compressed PMI. In certain aspects, the UE utilizes a DFT matrix $F_{Nsb,Nsb}$ having a size of "Nsb×Nsb" for deriving the time domain representation.

In certain aspects, prior to deriving the time domain representation of the spatially compressed PMI, the UE may search the basis of $B_{Nt,Nb}$, and perform a pre-rotation of the spatially compressed PMI based on a dominant eigen vector of the PMI. The dominant eigen vector may be denoted as $v_{Nsb}$. In certain aspects, the UE may extract the phase of $v_{Nsb}$, denoted as $p_{Nsb}$. In certain aspects, $p_{Nsb}$ can be extracted using a phase extraction function angle( ) where:

$$p_{Nsb} = \text{angle}(v_{Nsb}).$$

In certain aspects, once $p_{Nsb}$ is extracted, a phase rotation of the PMI ($V_{Nsb,Nb}^{(2)}$) may be performed using $p_{Nsb}$. A phase-rotated PMI equals:

$$\text{diag}(p_{Nsb}) \times V_{Nsb,Nb}^{(2)},$$

where diag( ) represents a function for making a $N_{sb}$ length vector into $N_{sb} \times N_{sb}$ size matrix having a diagonal component that is the same as the vector. As described above, in order to derive the time domain representation of the phase-rotated and spatially compressed PMI, the UE may then perform a FFT operation.

In certain aspects, the UE may subsequently perform a time domain compression of the time-domain representation of the spatially compressed PMI. In certain aspects, the time domain compression involves performing a channel-tap selection of the time-domain representation of the spatially compressed PMI (referred to as a channel-tap compression). Channel-tap selection, in certain aspects, involves selecting active (e.g., dominant) taps from a number of taps in the time-domain representation of the spatially compressed PMI. In certain aspects, for each active tap ($T_{r,b,p_a}$), the amplitude and the phase of the active tap is quantized. For example, the amplitude and the phase may be quantized with 3 bits, or 2 bits for either amplitude or phase. In certain aspects, the level of quantization may be configurable.

The channel-tap information resulting from the channel-tap selection is shown in FIG. 11 as $V_{N_s,N_{sb}}^{(3)}$. In certain aspects, $V_{N_s,N_{sb}}^{(3)}$ comprises a maximum payload of $R \cdot 2L \cdot N_a \cdot 2Q + N_{ts}$ bits. In the function above, R corresponds to number of ranks. L corresponds to the number of beams. $N_a$ corresponds to the maximum number of active-channel taps selected and quantized per beam. $N_a$, in certain aspects, is configurable by the BS. In certain aspects, $N_a$ is reported to the BS by the UE reported. In certain aspects, $N_a$ is associated with the number of subbands ($N_{sb}$).

Further, in the function above, $N_a \cdot 2Q$ corresponds to the amplitude/phase quantization (e.g., with the same quantization level). The value of $N_a \cdot 2Q$ is normalized, as the maximum value in the CSI feedback for active-channel taps has 0 dB amplitude. $N_{ts}$ corresponds to the number of bits for reporting the selected channel-taps. In certain aspects, $N_{ts}$ is compressed. In certain aspects, the UE may compress $N_{ts}$ in different stages (e.g., multi-stage compression). In certain aspects, the channel-tap selection compression may be performed in two stages. In the first stage, the UE may explore the correlation between tap profiles of various beams, based on which the UE may select a number of active taps (e.g., a superset of taps) based on the correlation. $N_{a,max}$ indicates the number of first stage selected taps that are selected from a number of subbands $N_{sb}$.

In certain aspects, $N_{a,max}$ is configurable by the BS. In certain aspects, the $N_{a,max}$ is reported by the UE to the BS. In certain aspects, the $N_{a,max}$ is associated with $N_{sb}$. In certain aspects, $N_{a,max}$ may correspond to all beams and layers (e.g., corresponding overhead is $\lceil \log_2 C_{N_{sb}}^{N_{a,max}} \rceil$), or a single beam with different layers (e.g., corresponding overhead is $N_b \lceil \log_2 C_{N_{sb}}^{N_{a,max}} \rceil$), or a single layer with different beams (e.g., corresponding overhead is $R \lceil \log_2 C_{N_{sb}}^{N_{a,max}} \rceil$).

After performing the first stage of the channel-tap selection, resulting in $N_{a,max}$, the UE performs the second stage. The second stage involves selecting a number of taps $N_a$ from the maximum number of taps $N_{a,max}$ for each beam and/or layer. Note that $N_a \leq N_{a,max}$.

After the multi-stage compression described above, the total number of bits for reporting the channel-tap selection is:

$$N_{ts} = N_{ts,1} + N_{ts,2} = \lceil \log_2 C_{N_{sb}}^{N_{a,max}} \rceil R \cdot 2L \cdot \lceil \log_2 C_{N_{a,max}}^{N_a} \rceil.$$

In certain aspects, the UE transmits the channel-tap compressed PMI along with the spatial compression matrix (e.g., $B_{Nt,Nb}$ with an orthogonal DFT beam basis), used to spatially compress the PMI, to the BS. Once the BS receives the spatial compression matrix and the channel-tap compression PMI, the BS performs spatial and time domain decompression in order to recreate the original PMI. For example, the BS utilizes a matrix (e.g., DFT matrix $F^H_{Nsb,Nsb}$ having a size of "Nsb×Nsb") to transform the channel-tap compressed PMI ($V_{N_{sb},N_b}^{(3)}$) and derive a frequency domain representation of the PMI ($V_{N_{sb},N_b}^{(2)}$). In certain aspects, the BS is preconfigured with such a matrix. The BS then uses the spatial compression matrix $B_{Nt,Nb}$ received from the UE to perform a spatial decompression of the frequency domain representation of the PMI in order to derive the original PMI ($V_{N_{sb},N_b}^{(1)}$). For example, the BS may apply $B_{Nt,Nb}^H$ for the spatial decompression. In certain aspects, the BS may be pre-configured with the spatial decompression matrix $B_{Nt,Nb}^H$. In such aspects, the UE does not transmit the $B_{Nt,Nb}$ to the BS.

Figure 12:
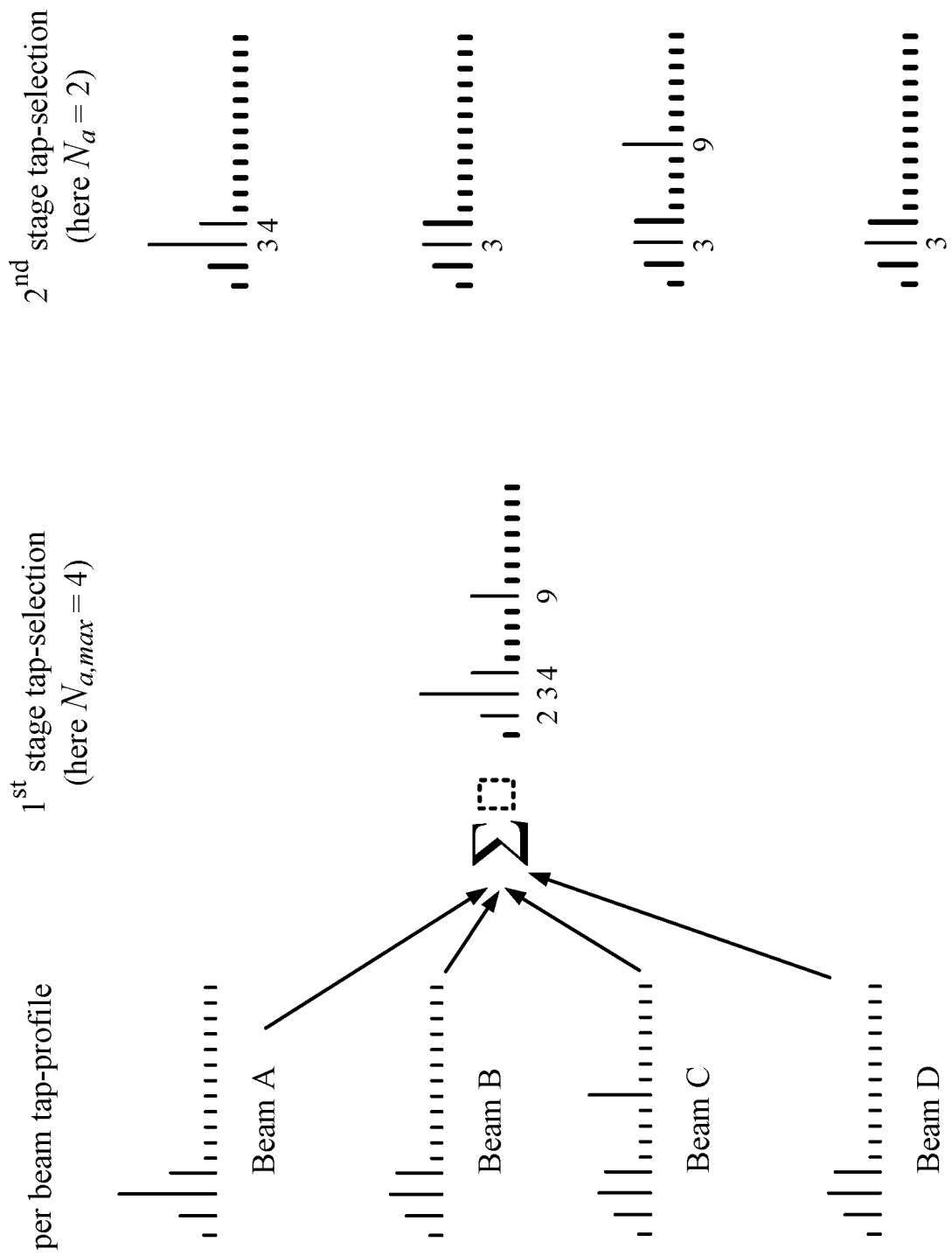
FIG. 12 illustrates an example of a multi-stage channel-tap selection process.

FIG. 12 illustrates an example of the two-stage channel-tap selection described above. As shown, in the first stage, the UE may examine the correlation between the tap profiles of Beams A-D. The UE may then select tap indexes of the most active or dominant taps among Beams A-D. In the example of FIG. 12, the UE may determine that tap indexes 2, 3, 4 and 9 correspond to the most active taps in the tap profiles of Beams A-D. $N_{a,max}$ corresponds to the number of tap indexes (i.e., $N_{a,max}$=4) out of the 16 possible tap indexes ($N_{sb}$=16). In the second stage, the most active taps from tap indexes 2, 3, 4, and 9 are selected for each beam. For example, for Beam A, the most active taps are taps 3 and 4 (i.e., $N_a$=2). For Beam B, the most active tap is tap 3 (i.e., $N_a$=1). For Beam C, the most active taps are taps 3 and 9 (i.e., $N_a$=2). Finally, for Beam D, the most active tap is tap 3 (i.e., $N_a$=1).

Accordingly, in the example of FIG. 12, compressing the channel-tap information reduces the payload associated with indicating the active taps associated with Beams A-D. For example, without compressing the channel-tap information, to indicate taps 3 and 4 for Beam A, tap 1 for Beam B, taps 3 and 9 for Beam B, and tap 1 for Beam D, the UE may need to use 64 bits (4*16). But by using the multi-stage compression technique above, the UE may use 16 bits to indicate tap indexes 2, 3, 4, and 9 and only 4 bits to indicate the active taps out of tap indexes 2, 3, 4, and 9 for each beam.

In certain aspects, the indication of the taps (e.g., information reported by the UE to the BS about the taps) may comprise or use an index of hypothesis corresponding to taps selected in the first stage and the second stage for each beam. In such aspects, at most $K_1 = N_{a,max} \times \log_2 \lceil N_{sb} \rceil = 16$ bits may be used for the indication, where $N_{a,max}$=4 and $N_{sb}$=16. In certain aspects, the indication of the taps may comprise or use a combination of hypothesis corresponding to taps selected in the first stage and the second stage for each beam. In such aspects, at most $K_2 = \lceil \log_2 C_{N_{sb}}^{N_{a,max}} \rceil = 11$ bits, may be used for the indication. In certain aspects, the indication of the taps may comprise or use a combination of hypothesis corresponding to taps selected in the first stage (first subset of a plurality of taps).

In certain aspects, the indication of the taps may comprise or use a bitmap like indication corresponding to taps selected in the first stage and the second stage for each beam. In such aspects, the bitmap uses a sequence of '1s' and '0s' for the indication. Also, at most $K_3 = N_{sb} = 16$ bits may be used for the bit-map, where at most $N_{a,max}$ '1's exist in 16-bit sequence. In certain aspects, the indication of the taps may comprise or use a bitmap corresponding to taps selected in the second stage (second subsets of the first subset).

In certain aspects, a mixture of a bitmap and the combination of hypothesis may be used to indicate the taps selected in first stage and the second stage. For example, the indication of the taps may comprise or use a bitmap corresponding to taps selected in the second stage. The indication may further comprise a combination of hypothesis corresponding to taps selected in the first stage (first subset of a plurality of taps).

In certain aspects, the UE may omit some overhead if not enough payload is available. Under 3GPP's Rel.15 Type-II PMI feedback scheme, the priority order for reporting PMI is as follows: PMI-1 (wideband), PMI-2-even subbands, PMI-2-odd subbands. In other words, if there is not enough payload, bits associated with PMI-2-odd subbands may first be omitted, then bits associated with PMI-2-even subbands may be omitted, and so on. However, since PMI that is spatially and time domain compressed is not based on subbands, the priority orders of 3GPP's Rel.15 Type-II PMI feedback are not applicable.

Accordingly, certain embodiments herein relate to a PMI feedback priority scheme that is based on taps/tap groups or beams/beam groups.

Figure 13:
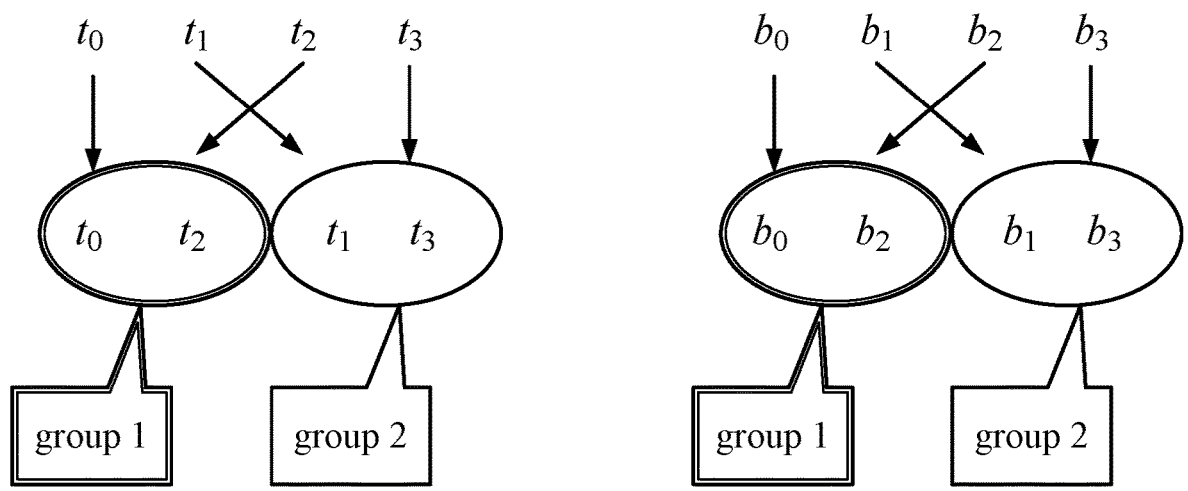
FIG. 13 illustrates an example separation of taps and beams into different priority groups, according to aspects of the present disclosure.

FIG. 13 illustrates the separation of taps and beams into different priority groups. In certain aspects, the UE may separate taps into different tap priority groups with different reporting priorities. For example, as shown in FIG. 13, taps $t_0$ and $t_2$ are assigned to tap priority group 1 while taps $t_1$ and $t_3$ are assigned to tap priority group 2, with tap priority group 1 having a higher reporting priority than tap priority group 2. In another example, the UE may select half (i.e., $N_a/2$) of the originally selected taps $N_a$, which may correspond to at least $\lceil \log_2 C_{N_a}^{N_a/2} \rceil$ bits, and assign them to tap priority group 1 while assigning the rest to tap priority group 2. In certain aspects, the different tap priority groups may be indicated by signaling.

In certain aspects, the UE may separate beams into different beam priority groups with different reporting priorities. For example, as shown in FIG. 13, beams $b_0$ and $b_2$ are assigned to beam priority group 1 while beams $b_1$ and $b_3$ are assigned to beam priority group 2, with priority group 1 having a higher reporting priority than priority group 2. In another example, the UE may select half (i.e., $N_b/2$) of the originally selected beams $N_b$ for reporting, which may correspond to at least $\lceil \log_2 C_{N_b}^{N_b/2} \rceil$ bits, and assign them to beam priority group 1 while assigning the rest to beam priority group 2. In certain aspects, the different beam priority groups may be indicated by signaling. Note that a beam in the aspects described herein refers to a UE-calculated beam that is defined in or a part of the PMI.

Figure 14:
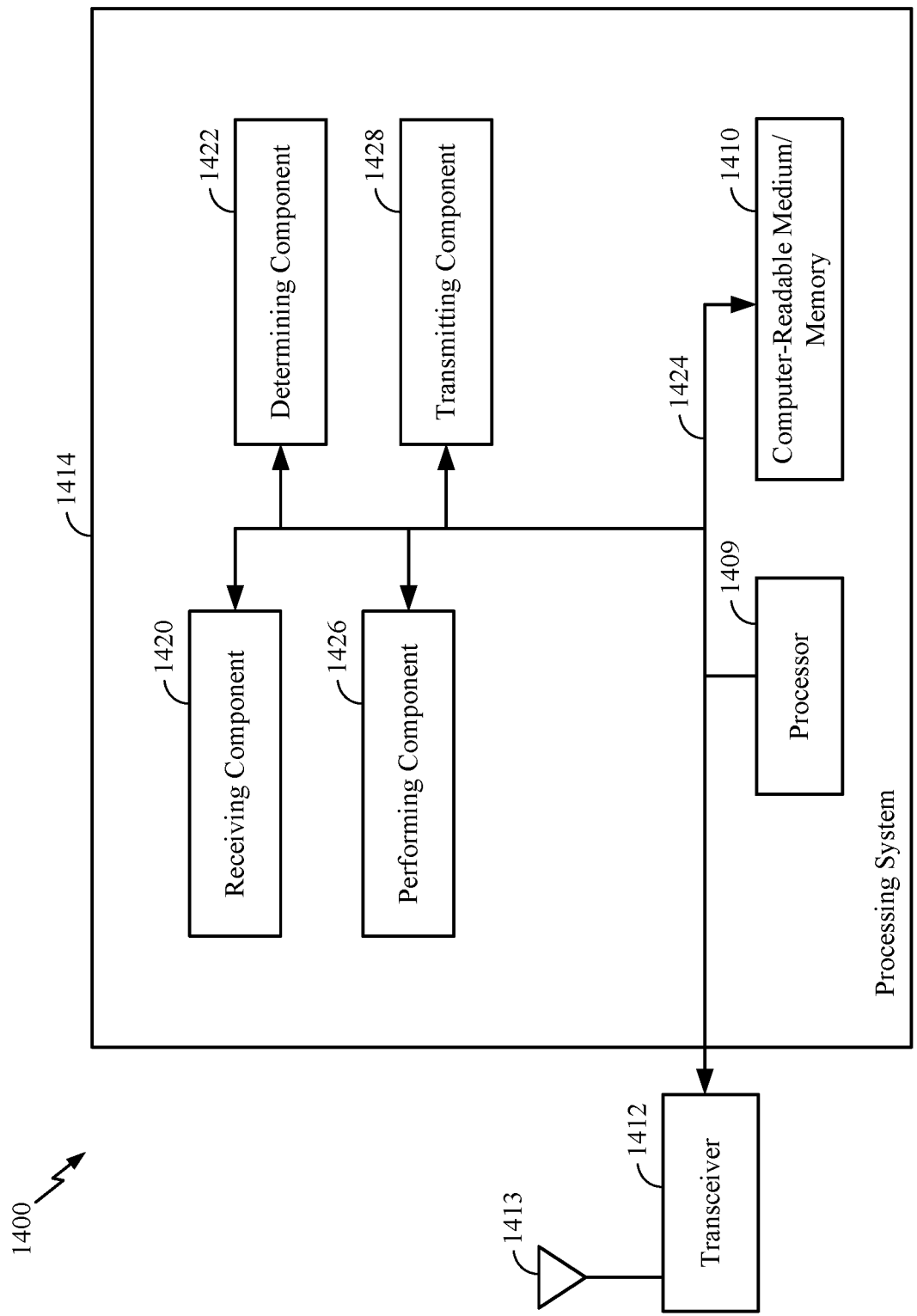
FIG. 14 illustrates a communications device that may include various components configured to perform operations for the techniques disclosed herein, such as one or more of the operations illustrated in FIG. 9.

FIG. 14 illustrates a wireless communications device 1400 (the first wireless communications device corresponding to FIG. 9) that may include various components (e.g., corresponding to means-plus-function components) configured to perform operations for the techniques disclosed herein, such as one or more of the operations illustrated in FIG. 9. The communications device 1400 includes a processing system 1414 coupled to a transceiver 1412. The transceiver 1412 is configured to transmit and receive signals for the communications device 1400 via an antenna 1413. The processing system 1414 may be configured to perform processing functions for the communications device 1400, such as processing signals, etc.

The processing system 1414 includes a processor 1409 coupled to a computer-readable medium/memory 1410 via a bus 1424. In certain aspects, the computer-readable medium/memory 1410 is configured to store instructions that when executed by processor 1409, cause the processor 1409 to perform one or more of the operations illustrated in FIG. 9, or other operations for performing the various techniques discussed herein.

In certain aspects, the processing system 1414 further includes a receiving component 1420 for performing one or more of the operations illustrated at 902 in FIG. 9. Additionally, the processing system 1414 includes a determining component 1422 for performing one or more of the operations illustrated at 904 in FIG. 9. Additionally, the processing system 1414 includes a performing component 1426 for performing one or more of the operations illustrated at 906 in FIG. 9. Additionally, the processing system 1414 includes a transmitting component 1428 for performing one or more of the operations illustrated at 908 in FIG. 9.

The receiving component 1420, the determining component 1422, the performing component 1426, and the transmitting component 1428 may be coupled to the processor 1409 via bus 1424. In certain aspects, receiving component 1420, the determining component 1422, the performing component 1426, and the transmitting component 1428 may be hardware circuits. In certain aspects, the receiving component 1420, the determining component 1422, the performing component 1426, and the transmitting component 1428 may be software components that are executed and run on processor 1409.

Figure 15:
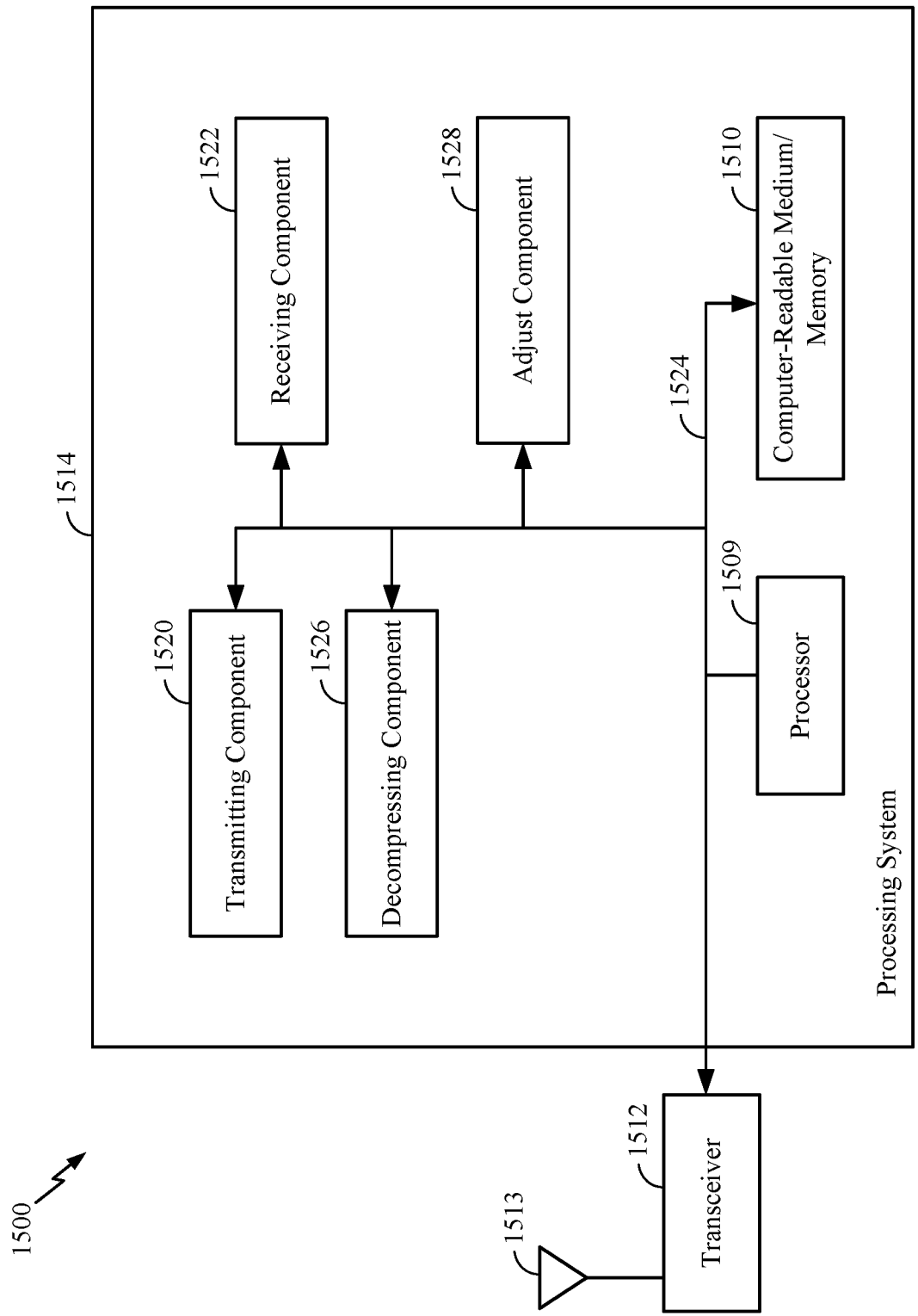
FIG. 15 illustrates a communications device that may include various components configured to perform operations for the techniques disclosed herein, such as one or more of the operations illustrated in FIG. 10.

FIG. 15 illustrates a wireless communications device 1500 (the second wireless communications device corresponding to FIG. 10) that may include various components (e.g., corresponding to means-plus-function components) configured to perform operations for the techniques disclosed herein, such as one or more of the operations illustrated in FIG. 10. The communications device 1500 includes a processing system 1514 coupled to a transceiver 1512. The transceiver 1512 is configured to transmit and receive signals for the communications device 1500 via an antenna 1513. The processing system 1514 may be configured to perform processing functions for the communications device 1500, such as processing signals, etc.

The processing system 1514 includes a processor 1509 coupled to a computer-readable medium/memory 1510 via a bus 1524. In certain aspects, the computer-readable medium/memory 1510 is configured to store instructions that when executed by processor 1509, cause the processor 1509 to perform one or more of the operations illustrated in FIG. 10, or other operations for performing the various techniques discussed herein.

In certain aspects, the processing system 1514 further includes a transmitting component 1520 for performing one or more of the operations illustrated at 1002 in FIG. 10. Additionally, the processing system 1514 includes a receiving component 1522 for performing one or more of the operations illustrated at 1004 in FIG. 10. Additionally, the processing system 1514 includes a decompressing component 1526 for performing one or more of the operations illustrated at 1006 in FIG. 10. Additionally, the processing system 1514 includes an adjusting component 1528 for performing one or more of the operations illustrated at 1008 in FIG. 10.

The transmitting component 1520, the receiving component 1522, the determining component 1523, and the adjusting component 1528 may be coupled to the processor 1509 via bus 1524. In certain aspects, the transmitting component 1520, the receiving component 1522, the determining component 1523, and the adjusting component 1528 may be hardware circuits. In certain aspects, the transmitting component 1520, the receiving component 1522, the determining component 1523, and the adjusting component 1528 may be software components that are executed and run on processor 1509.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations (e.g., operations described in FIGS. 9-10) described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications by a first wireless communications device, comprising:
   receiving one or more signals from a second wireless communications device;
   determining a precoder matrix index (PMI) based on the signals;
   performing a channel-tap compression of the PMI by determining a first subset of a plurality of taps corresponding to a plurality of beams based on a time domain representation of the PMI, and for each of the plurality of beams, determining a second subset of the first subset; and
   transmitting the channel-tap compressed PMI to the second wireless communications device, wherein the channel-tap compressed PMI comprises information indicative of the first subset and each of the second subsets.

2. The method of claim 1, wherein the information comprises an index hypothesis corresponding to the first subset and each of the second subsets.

3. The method of claim 1, wherein the information comprises a combination hypothesis corresponding to the first subset and each of the second subsets.

4. The method of claim 1, wherein the information comprises a combination hypothesis corresponding to the first subset.

5. The method of claim 1, wherein the information comprises a bitmap.

6. The method of claim 5, wherein the bitmap corresponds to the second subsets.

7. The method of claim 1, wherein the information comprises a combination hypothesis corresponding to the first subset, and wherein the information further comprises a bitmap corresponding to the second subsets.

8. The method of claim 1, wherein:
   the PMI is spatially compressed by the first wireless communications device; and
   the spatially compressed PMI is pre-rotated based on a dominant vector of the PMI by the first wireless communications device prior to performing the channel-tap compression of the PMI.

9. The method of claim 1, wherein:
   the plurality of beams are divided into a plurality of beam groups;
   the plurality of beam groups are prioritized based on a first order; and
   wherein bits for transmitting the information are assigned based on the first order.

10. The method of claim 1, wherein:
    the plurality of taps are divided into a plurality of tap groups;
    the plurality of tap groups are prioritized based on a second order; and
    wherein bits for transmitting the information are assigned based on the second order.

11. A method of wireless communications by a second wireless communications device, comprising:
    transmitting one or more signals to a first wireless communications device;
    receiving a channel-tap compressed precoder matrix index (PMI) from the first wireless communications device, wherein the channel-tap compressed PMI comprises information indicative of a first subset of a plurality of taps corresponding to a plurality of beams, and the information is further indicative of a second subset of the first subset associated with each of the plurality of beams;
    decompressing the channel-tap compressed PMI to derive a PMI; and
    adjusting a configuration of one or more antennas of a base station (BS) based on the PMI.

12. The method of claim 11, wherein the information comprises an index hypothesis corresponding to the first subset and each of the second subsets.

13. The method of claim 11, wherein the information comprises a combination hypothesis corresponding to the first subset and each of the second subsets.

14. The method of claim 11, wherein the information comprises a bitmap.

15. The method of claim 11, wherein the decompressing further comprises:
    deriving a frequency domain representation of the channel-tap compressed PMI; and
    decompressing the frequency domain representation of the channel-tap compressed PMI using a spatial decompression matrix.

16. A first apparatus, comprising:
 means for receiving one or more signals from a second apparatus;
 means for determining a precoder matrix index (PMI) based on the signals;
 means for performing a channel-tap compression of the PMI comprising means for determining a first subset of a plurality of taps corresponding to a plurality of beams based on a time domain representation of the PMI, and for each of the plurality of beams, means for determining a second subset of the first subset; and
 means for transmitting the channel-tap compressed PMI to the second apparatus, wherein the channel-tap compressed PMI comprises information indicative of the first subset and each of the second subsets.

17. The first apparatus of claim 16, wherein the information comprises a combination hypothesis corresponding to the first subset and each of the second subsets.

18. The first apparatus of claim 16, wherein the information comprises a combination hypothesis corresponding to the first subset.

19. The first apparatus of claim 16, wherein the information comprises a bitmap.

20. The first apparatus of claim 16, wherein the information comprises a combination hypothesis corresponding to the first subset, and wherein the information further comprises a bitmap corresponding to the second subsets.

21. The first apparatus of claim 16, wherein:
 the plurality of taps are divided into a plurality of tap groups;
 the plurality of tap groups are prioritized based on a second order; and
 wherein bits for transmitting the information are assigned based on the second order.

22. A second apparatus, comprising:
 means for transmitting one or more signals to a first apparatus;
 means for receiving a channel-tap compressed precoder matrix index (PMI) from the first apparatus, wherein the channel-tap compressed PMI comprises information indicative of a first subset of a plurality of taps corresponding to a plurality of beams, and the information is further indicative of a second subset of the first subset associated with each of the plurality of beams;
 means for decompressing the channel-tap compressed PMI to derive a PMI; and
 means for adjusting a configuration of one or more antennas of a base station (BS) based on the PMI.

23. The second apparatus of claim 22, wherein the information comprises a combination hypothesis corresponding to the first subset and each of the second subsets.

24. The second apparatus of claim 22, wherein the information comprises a combination hypothesis corresponding to the first subset.

25. The second apparatus of claim 16, wherein the information comprises a combination hypothesis corresponding to the first subset, and wherein the information further comprises a bitmap corresponding to the second subsets.

26. The second apparatus of claim 22, wherein:
 the plurality of taps are divided into a plurality of tap groups;
 the plurality of tap groups are prioritized based on a second order; and
 wherein bits for transmitting the information are assigned based on the second order.

* * * * *